Aug. 11, 1942.   J. A. CANN   2,292,866
MACHINE FOR SEPARATING ASBESTOS-CEMENT PIPES FROM MANDRELS
Filed May 23, 1941   4 Sheets-Sheet 3

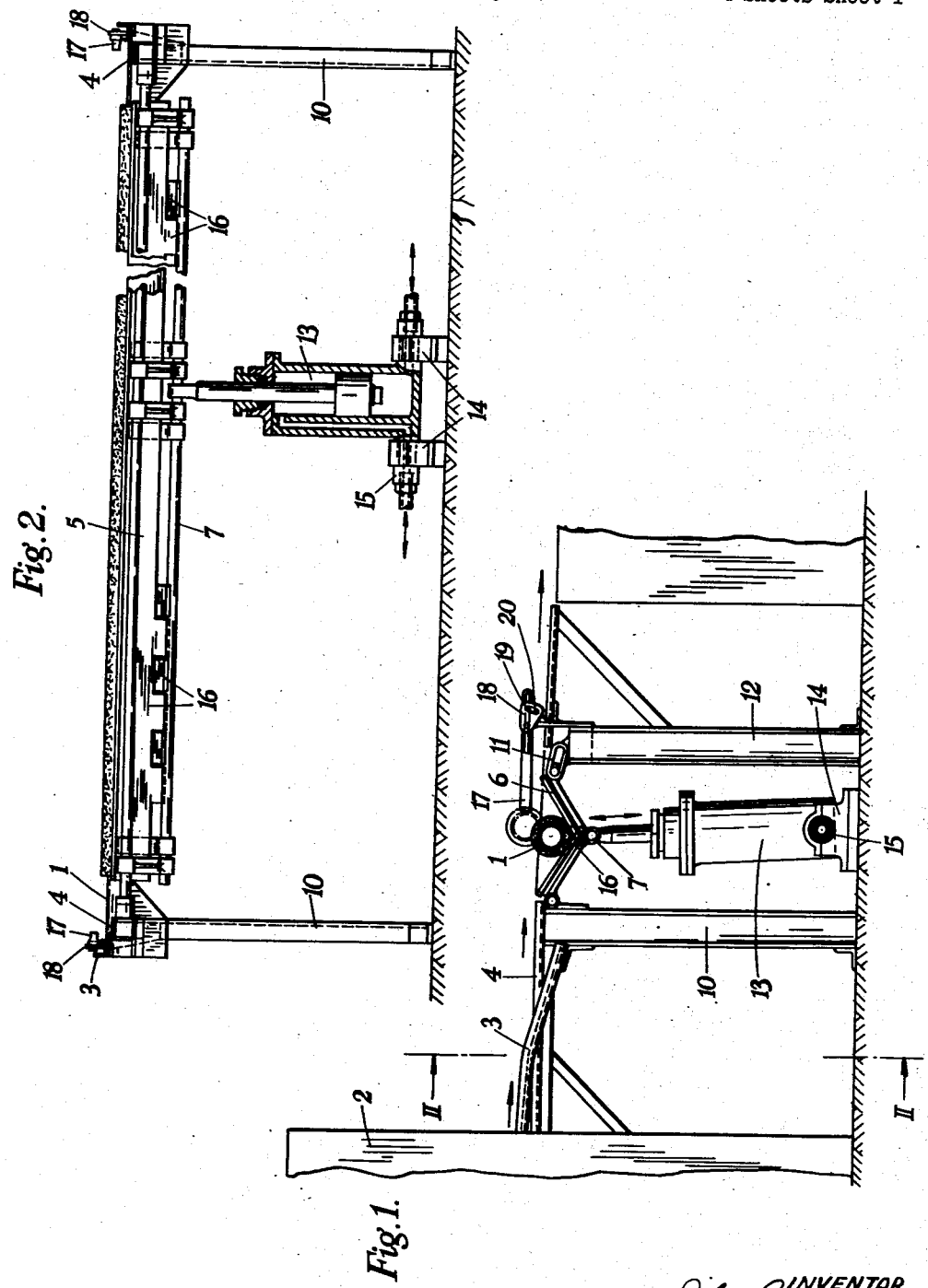

INVENTOR
John Arthur Cann
BY
Edwards, Bower & Pool
ATTORNEYS

Aug. 11, 1942.  J. A. CANN  2,292,866
MACHINE FOR SEPARATING ASBESTOS-CEMENT PIPES FROM MANDRELS
Filed May 23, 1941  4 Sheets-Sheet 4

INVENTOR
John Arthur Cann
BY
Edwards, Bower & Pool
ATTORNEYS

Patented Aug. 11, 1942

2,292,866

UNITED STATES PATENT OFFICE 2,292,866

MACHINE FOR SEPARATING ASBESTOS-CEMENT PIPES FROM MANDRELS

John Arthur Cann, Bickley, England, assignor to Turner & Newall Limited, Spotland, Rochdale, England, a British company Application May 23, 1941, Serial No. 394,911
In Great Britain June 12, 1940

8 Claims. (Cl. 25—30)

Pipes from asbestos-cement or like material, that is to say, fibrous material and a binding agent, are commonly formed on mandrels; the invention is concerned with the machines for separating the pipes and mandrels.

At present it is the usual practice to loosen the pipes on the mandrels by a process known as calendering, take the loosened pipes, still on their mandrels, to a machine in which the mandrels are held stationary while the pipes are drawn off them, insert split wooden mandrels in the pipes, and allow the pipes to set and dry on these wooden mandrels. It will readily be seen that this involves a considerable amount of handling of the pipes before and after they are removed from the mandrels, and the mandrels are very heavy and awkward to handle.

The principal object of this invention is to provide an improved machine for effecting the separation of a mandrel and its coating.

A further object of the invention is to provide track means for coated mandrels and to make part of the track means deformable into a supporting cradle for the coated mandrel while the mandrel and its coating are separated.

Another object is to provide a machine in which a coated mandrel can be rolled along a track until it reaches a part of the track deformable into a cradle, and then the part can be deformed to form a cradle in which the pipe formed by the coating rests while the mandrel is removed, the pipe being subsequently rolled away on the restoration of the deformable part to its original position.

The invention will be best understood from the following description of the preferred embodiment, taken in conjunction with the annexed drawings, in which:

Figure 1 is an elevation, partly in section;

Figure 2 is a front view; and

Figure 3:
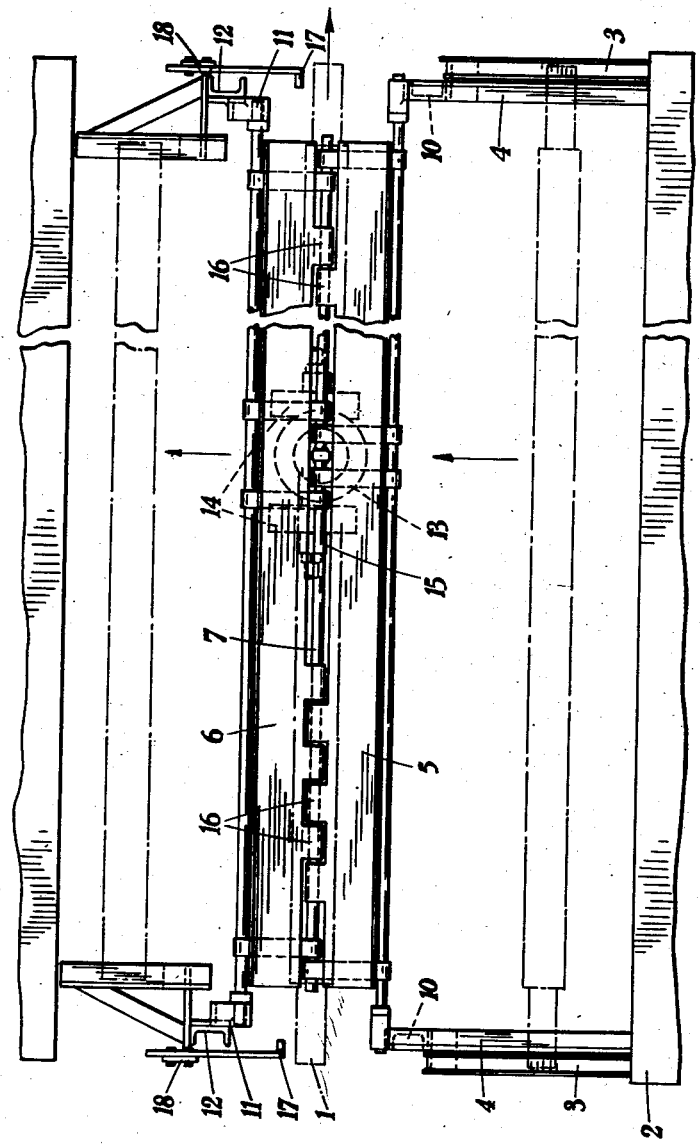
Figure 3 is a plan of part of the machine.

The machine is shown as part of a complete plant for the production of asbestos-cement pipes. Coated mandrels 1 pass from a pipe-forming machine onto a runway constructed as described in application Serial No. 394,910 of even date herewith, are calendered in a machine made as described in application Serial No. 394,908 of even date herewith, and arranged in the runway, and then passed through a chamber containing hot humid air as described in application Serial No. 394,909 of even date herewith. The end of this chamber is shown at 2, and the coated mandrels leave it by a runway composed of two tracks 3 from which they roll onto track means in the form of a runway 4. Part of this runway is deformable and consists of two hinged metal leaves 5 and 6, having meeting edges with complementary castellated projections and recesses 16, so that when the two leaves are in the flat position the supporting surface which they form is effectively continuous.

The leaves 5 and 6 are hinged together by a rod 7 and the leaf 5 is hinged to supports 10 for the runway 4. The leaf 6 is connected by pin-and-slot connections to brackets 11 which are rigidly connected to supports 12 for another part of the runway. The whole runway 4, including the deformable part slopes slightly, so that the pipes, both before and after the withdrawal of the mandrels, will run down it easily.

The rod 7 is pivotally connected to the plunger of an hydraulic cylinder 13, which is mounted in bearings 14 to rock about a horizontal axis 15. When the plunger is lowered, this cylinder is forced to rock slightly by the mechanical linkage that includes the pin-and-slot connections, and the leaves 5 and 6 move into the trough position shown in Figure 1.

Figure 4:
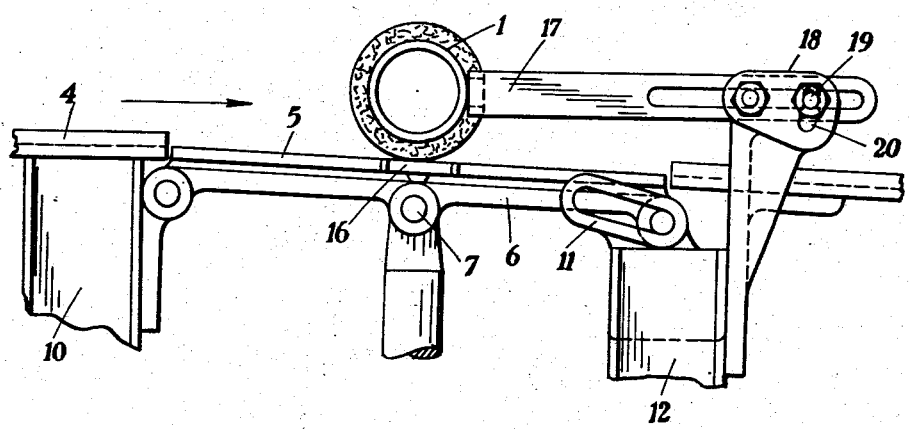
Figures 4 and 5 are two views at right angles to one another, showing part of the machine to a larger scale.
Figure 5:
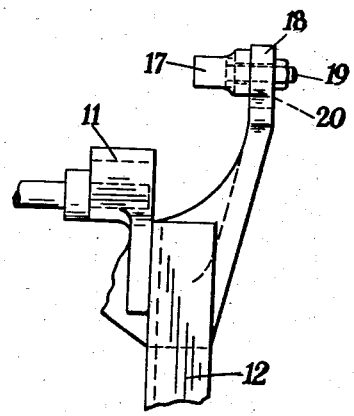

In order to ensure that the coated mandrels are stopped on the middle of the deformable part, stops 17 carried by brackets 18 fixed to the supports 12 are provided. The uncoated ends of the mandrels abut against these stops, as shown in Figures 4 and 5. Since the mandrels may vary considerably in size, say from 4" to 18" in diameter, the stops 17 are made adjustable, both in the extent to which they project towards the middle of the deformable cradle and angularly, by means of pin-and-slot connections 19 and 20.

Figure 6:
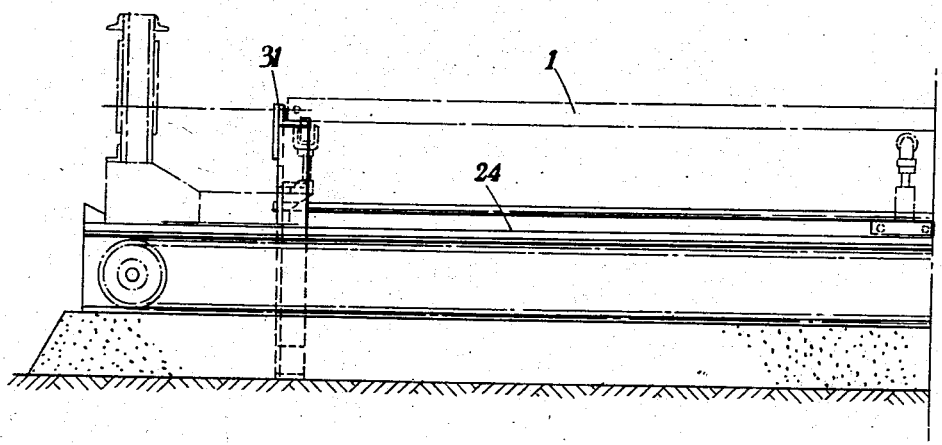
Figures 6 and 7 are side and end elevations of another part of the machine.
Figure 7:
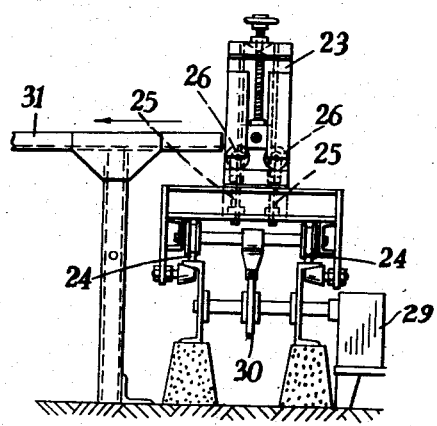
Figure 6A:
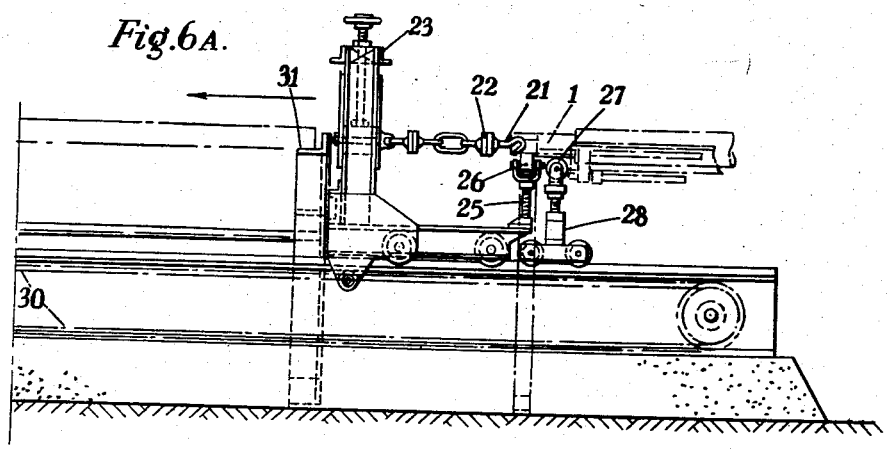
Figure 6a is a side elevation of the part of the machine to the right of Figure 6 and illustrating the mechanism for withdrawing the mandrels.

When the mandrel is in the trough formed by the deformable part, it is engaged by a mechanism which withdraws it axially, the coating that forms the pipe being left on the deformable part. This mechanism, shown in Figures 6 and 7, includes a hook 21 which engages an eye formed on the end of the mandrel. The hook is attached by a universal joint 22 to a carriage 23 which is mounted to run on rails 24. The carriage also carries supports 25 for rollers 26 onto which the end of the mandrel is drawn and by which it is supported during the axial movement. Additional rollers 27 are carried by a separate carriage 28. The carriage 23 is driven by a motor 29 through an endless chain 30. As it moves away from the runway it pulls the mandrel with it. The carriage 28 also moves, but as it is not positively driven it lags behind the carriage 23, and thus the mandrel is adequately supported. When the carriage 23 reaches the end of its run, the two ends of the mandrel are brought opposite to two rails 31 which form a return runway, and the mandrel is rolled onto these rails.

If the frictional engagement between the trough and the pipe is not enough to retain the pipe in the trough while the mandrel is being removed, a collar engaging the pipe and fixed to the trough may be placed over the end of the mandrel.

Adjustment to accommodate mandrels of different sizes is effected by raising or lowering the part of the carriage 23 that carries the hook 21, and also the supports for the rollers 26 and 27.

I claim:

1. In a machine for treating mandrels bearing asbestos-cement or like coatings, track means along which coated mandrels can roll, means adjacent a part of said track means for separating a mandrel and its coating, and means for intermittently deforming said part of said track means adjacent said separating means so as to reshape said part and transform it from a track means into a supporting cradle for said mandrel and coating.

2. In a machine for treating mandrels bearing asbestos-cement or like coatings, track means along which coated mandrels can roll, means adjacent a part of said track means for withdrawing mandrels axially from their coatings, and means for intermittently deforming the part of said track means adjacent said withdrawing means so as to reshape said part and transform it from a track means into a cradle for supporting the coating during the withdrawing operation.

3. In a machine for treating mandrels bearing asbestos-cement or like coatings, track means along which coated mandrels can roll, part of said track means being intermittently deformable so as to reshape said part and transform it from a track means into a cradle, and means adjacent said deformable part for separating a mandrel and its coating when the coated mandrel is resting in said cradle.

4. In a machine for treating mandrels bearing asbestos-cement or like coatings, track means along which coated mandrels can roll, said track means including a pair of hinged members capable for forming a flat unbroken surface or a V-shaped trough, and means adjacent said hinged members for separating a mandrel and its coating when the coated mandrel is resting in said trough.

5. In a machine for treating mandrels bearing asbestos-cement or like coatings, the combination claimed in claim 4, in which said hinged members are metal leaves with complementary projections and recesses along their meeting edges over at least part of their length.

6. In a machine for treating mandrels bearing asbestos-cement or like coatings, track means along which coated mandrels can roll, part of said track means being intermittently deformable so as to reshape said part and transform it from a track means into a supporting cradle, stop means operative to stop coated mandrels on said deformable part but to allow the coatings to pass, and means adjacent said deformable part for withdrawing a mandrel axially from its coating.

7. In a machine for treating mandrels bearing asbestos-cement or like coatings, track means along which coated mandrels can roll, part of said track means being deformable into a supporting cradle, hydraulic means disposed below said deformable part and operative to support said deformable part and move it from a cradle position into a flat position and means adjacent said deformable part for separating a mandrel and its coating when the coated mandrel is resting on the deformable part in the cradle position thereof.

8. In a machine for treating mandrels bearing asbestos-cement or like coatings, the combination claimed in claim 7 wherein said hydraulic means comprises at least one pivotally mounted hydraulic ram.

JOHN ARTHUR CANN.